Feb. 25, 1969     R. W. NOLAN     3,430,124
BATTERY CHARGING SYSTEMS
Filed Aug. 17, 1966
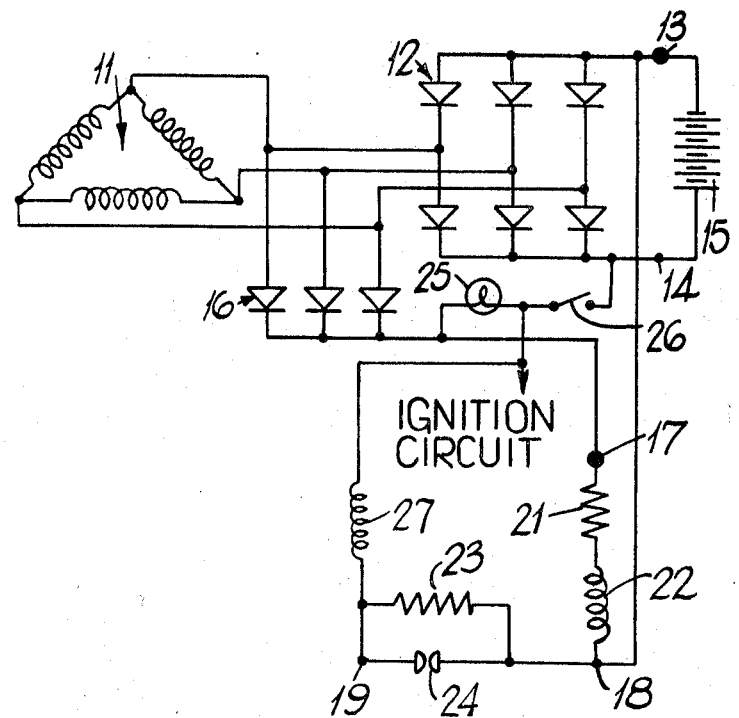

United States Patent Office

3,430,124
Patented Feb. 25, 1969

3,430,124
BATTERY CHARGING SYSTEMS
Roger William Nolan, Redditch, England, assignor to Joseph Lucas (Industries) Limited, Birmingham, England
Filed Aug. 17, 1966, Ser. No. 572,989
Claims priority, application Great Britain, Sept. 29, 1965, 41,311/65
U.S. Cl. 320—48         1 Claim
Int. Cl. H02j 7/18, 7/10

---

ABSTRACT OF THE DISCLOSURE

In a battery charging system for use in a road vehicle, an alternator charges a battery through a full wave rectifier and a voltage regulator is provided having an input terminal, an output terminal connected to one battery terminal, and a field terminal. The voltage sensing coil is connected between the input and output terminals, and a pair of contacts is connected between the output and field terminals. The system further includes one or more diodes providing an input from the alternator to the input terminal of the voltage regulator, and an ignition warning lamp is used having one side connected to the input terminal, and the field winding of the alternator has one side connected to the input terminal, and the field winding of the alternator has one side connected to the field terminal, the other side of both the field winding and the warning lamp being connected to the other battery terminal through the ignition switch.

---

This invention relates to battery charging systems for use in road vehicles.

A system according to the invention comprises in combination an alternator, first and second terminals between which in use the battery of the vehicle is connected, a full wave rectifier through which the output from the alternator is fed to the first and second terminals, a voltage regulator including an input terminal, an output terminal connected to said first terminal, and a field terminal, a voltage-sensing coil connected between the input and output terminals, and a pair of contacts connected between the output and field terminals, the pair of contacts being opened when the voltage across the coil reaches a predetermined value, the system further including one or more additional diodes providing an input from the alternator to said input terminal, an ignition warning lamp having one side connected to said input terminal, and a field winding forming part of the alternator and having one side thereof connected to said field terminal, the other side of the field winding and the other side of the warning lamp being connected in use to the second terminal through the ignition switch of the vehicle.

An example of the invention is illustrated in the accompanying drawing.

Referring to the drawing, there is provided a three-phase alternator 11 which is as shown is delta-connected, but could equally be well star connected. The alternator is driven by the engine of a road vehicle, and its output is fed through a full wave rectifier 12 to terminals 13, 14 between which in use the battery 15 of the vehicle is connected. Moreover, the phase points of the alternator are connected to the anodes of three additional diodes 16.

The system further includes a voltage regulator having an input terminal 17, an output terminal 18 connected to the terminal 13, and a field terminal 19. Connected between the terminals 17, 18 is a resistor 21 in series with a voltage-sensing coil 22, whilst connected in series between the terminals 18, 19 is a resistor 23 in parallel with a pair of normally closed contacts 24 which are opened by the coil 22 when the voltage across the coil 22 reaches a predetermined value.

The cathodes of the diodes 16 are connected to the terminal 17, which is also connected to one side of an ignition warning lamp 25, the other side of the lamp 25 being connected through the ignition switch 26 of the vehicle to the terminal 14. The terminal 14 is further connected through the ignition switch 26 and the field winding 27 of the alternator in series to the terminal 19.

In operation, when the ignition switch is closed immediately before starting the vehicle, current can flow from the terminal 14 through the switch 26, the field winding 27, and the closed contacts 26 back to the terminal 13, so that the field winding 27 is energised. Moreover, at this stage there is no output from the alternator and so the warning lamp 25 is energised through the ignition switch 26 by way of the resistor 21 and coil 22. The voltage developed across the coil 22 is insufficient to open the contacts 24 at this stage.

When the vehicle starts and the alternator produces an output, the voltage at the cathodes of the diode 16 rises until it reaches the battery voltage, at which point the warning lamp 25 is extinguished. Moreover, as the voltage continues to rise, a point is reached at which the voltage across the coil 22 opens the contacts 24, so that the field winding 27 is energised only through the resistor 23. The output of the alternator then falls, until a point is reached at which the contacts 24 close again. The arrangement is such that the warning lamp 25 does not become illuminated again unless the alternator is not charging the battery.

The arrangement described provides a particularly simple and effective warning lamp 25, and moreover eliminates the need for any extra resistor to energise the field winding 27 on starting, since the field winding 27 is energised directly by the battery. The diodes 16 serve only to extinguish the warning lamp 25 when required, and the power dissipated in these diodes is very small, so that they can be positioned in a small diode holder.

The invention is equally applicable to a two-stage regulator in which the contacts 24 open as described above at a predetermined voltage, and a further pair of contacts open at a higher voltage to short-circuit the winding 27.

Having thus described my invention what I claim as new and desire to secure by Letters Patent is:

1. A battery charging system for use in a road vehicle, comprising in combination an alternator, first and second terminals between which in use the battery of the vehicle is connected, a full wave rectifier through which the output from the alternator is fed to the first and second terminals, a voltage regulator including an input terminal, an output terminal connected to said first terminal, and a field terminal, a voltage-sensing coil connected between the input and output terminals, and a pair of contacts connected between the output and field terminals, the pair of contacts being opened when the voltage across the coil reaches a predetermined value, the system further including one or more additional diodes providing an input from the alternator to said input terminal, an ignition warning lamp having one side connected to said input terminal, and a field winding forming part of the alternator and having one side thereof connected to said field terminal, the other side of the field winding and the other side of the warning lamp being connected in use to the second terminal through the ignition switch of the vehicle.

References Cited

UNITED STATES PATENTS

| | | | |
|---|---|---|---|
| 3,217,311 | 11/1965 | Custer et al. | 320—48 X |
| 2,498,824 | 2/1950 | Rady | 320—69 X |
| 2,912,594 | 11/1959 | Raver | 320—64 X |
| 3,202,901 | 8/1965 | Peras | 320—68 X |

JOHN F. COUCH, *Primary Examiner.*

STANLEY WEINBERG, *Assistant Examiner.*

U.S. Cl. X.R.

320—99